United States Patent
Kubo et al.

(10) Patent No.: US 7,924,678 B2
(45) Date of Patent: Apr. 12, 2011

(54) RECORDING/REPRODUCING HEAD, RECORDING/REPRODUCING APPARATUS, RECORDING METHOD, AND REPRODUCING METHOD

(75) Inventors: Koichi Kubo, Yokohama (JP); Hiroshi Watanabe, Yokohama (JP); Katsuyuki Naito, Tokyo (JP); Takahiro Hirai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1290 days.

(21) Appl. No.: 11/495,591

(22) Filed: Jul. 31, 2006

(65) Prior Publication Data

US 2007/0047418 A1    Mar. 1, 2007

(30) Foreign Application Priority Data

Aug. 29, 2005    (JP) .................................. 2005-247759

(51) Int. Cl.
*G11B 7/00*    (2006.01)
(52) U.S. Cl. ...................................... 369/101; 369/126
(58) Field of Classification Search .................. 369/101, 369/126
See application file for complete search history.

(56) References Cited

U.S. PATENT DOCUMENTS 6,197,399 B1 * 3/2001 Naito et al. .................. 428/64.1
2004/0027935 A1 * 2/2004 Cho et al. ........................ 369/43

FOREIGN PATENT DOCUMENTS

| JP | 2001-189030 | | 7/2001 |
| JP | 2001-283479 | | 10/2001 |
| JP | 2003203404 A | * | 7/2003 |
| JP | 2004-14016 | | 1/2004 |
| JP | 2005-228658 | | 8/2005 |
| JP | 2005-332812 | | 12/2005 |

OTHER PUBLICATIONS

Japanese Office Action dated Sep. 29, 2009 in Japanese Application No. 2005247759 with an English translation.
J. Yagyu et al., JT-60U, "Analysis of Surface of Used First Wall", Tokyo University, Engineering Report of United Engineering Association, 2003, p. 7, lines 41-47, URL, http://www.ut-tech.iis.u-tokyo.ac.jp/uttech/7/07-16.pdf.

* cited by examiner

*Primary Examiner* — Wayne R Young
*Assistant Examiner* — LaTanya Bibbins
(74) *Attorney, Agent, or Firm* — Nixon & Vanderhye, PC (57) ABSTRACT

A recording/reproducing head includes a laminated body facing to a recording medium, the body including a first conductive layer, a first insulating layer and a second conductive layer which are sequentially stacked. The first conductive layer generates electrons and injects the electrons into the recording medium through the first insulating layer.

16 Claims, 3 Drawing Sheets

RECORDING/REPRODUCING HEAD, RECORDING/REPRODUCING APPARATUS, RECORDING METHOD, AND REPRODUCING METHOD

CROSS-REFERENCE TO RELATED APPLICATIONS

This application is based upon and claims the benefit of priority from prior Japanese Patent Application No. 2005-247759, filed Aug. 29, 2005, the entire contents of which are incorporated herein by reference.

BACKGROUND OF THE INVENTION

1. Field of the Invention

The present invention relates to a recording/reproducing head, recording/reproducing apparatus, recording method, and reproducing method and, more particularly, to a recording/reproducing head, recording/reproducing apparatus, recording method, and reproducing method which record or reproduce data by injecting electrons.

2. Description of the Related Art

Along with the steady increase in the quantity of data in the recent information-oriented societies, a recording method capable of implementing a much higher recording density than usual and a recording apparatus based on it are desired.

A magnetic recording apparatus representing probe recording apparatuses has no wiring to access a recording layer that records data. Hence, there is no restriction on the complex device structure to prevent write errors in adjacent portions in the recording layer and any decrease in speed. In addition, no problem of heat arises because simultaneous access to many recording layers does not occur. Hence, the apparatus is advantageous in microfabrication.

Actually, the limit of the recording density of a recording medium is supposed to sufficiently exceed 1 Tbpsi (terabit per square inch). However, a recording head and reproducing head have a complex structure to control the direction of electron spin, and it is difficult to achieve microfabrication of 50 nm or less.

A probe recording apparatus that stores charges instead of magnetism has a simpler head structure than the magnetic recording apparatus, and therefore, microfabrication is possible. A scheme of heating a recording medium by a near-field optical head to extract electrons from the recording medium side (e.g., reference 1 (JP-A 2001-189030 (KOKAI))) and a scheme of heating a probe by light to extract electrons from the probe side (e.g., reference 2 (JP-A 2001-283479 (KOKAI))) are proposed actually. A data recording scheme of causing dielectric polarization by applying an external voltage to a ferroelectric provided in a recording medium (e.g., reference 3 (JP-A 2004-14016 (KOKAI))) is also proposed.

In references 1 and 2, however, the cost considerably increases, and the microfabrication limit of the near-field optical head is supposed to be about 20 nm or more. In reference 3, when the ferroelectric is microfabricated to 50 nm or less, ferroelectricity is lost.

BRIEF SUMMARY OF THE INVENTION

According to a first aspect of the present invention, there is provided a recording/reproducing head comprising a laminated body facing to a recording medium, the body including a first conductive layer, a first insulating layer and a second conductive layer which are sequentially stacked. The first conductive layer generates electrons and injects the electrons into the recording medium through the first insulating layer.

According to a second aspect of the present invention, there is provided a recording/reproducing apparatus comprising: a recording medium to record data; and a recording/reproducing head which is arranged to face to the recording medium, includes a first conductive layer, a first insulating layer and a second conductive layer which are sequentially stacked, and records the data on the recording medium or reproduces data recorded on the recording medium. The first conductive layer generates electrons and injects the electrons into the recording medium through the first insulating layer.

According to a third aspect of the present invention, there is provided a recording method of causing a recording head including a first conductive layer, an insulating layer, and a second conductive layer which are sequentially stacked to record data on a recording medium, comprising: applying a voltage between the first conductive layer and the second conductive layer to generate electrons in the recording head; and injecting the electrons into the recording medium.

According to a fourth aspect of the present invention, there is provided a recording method of causing a recording head including a first conductive layer, an insulating layer and a second conductive layer which are sequentially stacked to record data on a recording medium, comprising: applying a voltage between the first conductive layer and the second conductive layer to generate electrons in the recording head; and injecting the electrons into a recording layer included in the recording medium and formed of a phase-change material to change the recording layer to one of a crystalline state and an amorphous state.

According to a fifth aspect of the present invention, there is provided a reproducing method of causing a reproducing head to reproduce data recorded on a recording medium, comprising: sensing an electric field by a field effect transistor (FET) sensor included in the reproducing head, the electric field leaking from the recording medium due to the recorded data; and measuring a current between a source region and a drain region included in the FET sensor.

According to a sixth aspect of the present invention, there is provided a reproducing method of causing a reproducing head including a first conductive layer, an insulating layer and a second conductive layer which are stacked sequentially to reproduce data recorded on a recording medium, comprising: applying a voltage between the first conductive layer and the second conductive layer to generate electrons in the reproducing head; injecting the electrons into a recording layer included in the recording medium to induce, in the recording layer, charges corresponding to the data; sensing the induced charges by an FET sensor included in the reproducing head; and measuring a current between a source region and a drain region included in the FET sensor.

DETAILED DESCRIPTION OF THE INVENTION

The embodiments of the present invention will be described below with reference to the accompanying drawing. The same reference numerals denote elements having the same functions and arrangements in the following description. The description will be repeated only when it is necessary.

Figure 1:
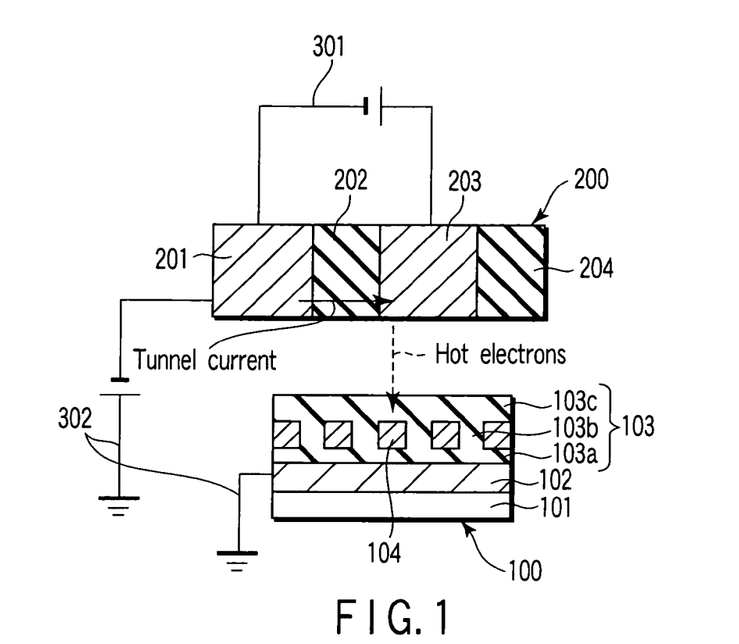
FIG. 1 is a sectional view illustrating the principle of a recording/reproducing apparatus according to an embodiment of the present invention.

The principle of a recording/reproducing apparatus according to an embodiment of the present invention will be described. FIG. 1 is a sectional view illustrating the principle of the recording/reproducing apparatus. The recording/reproducing apparatus comprises a recording medium 100 to record data, and a recording/reproducing head 200 that records data on the recording medium 100 and reproduces data recorded on the recording medium 100.

The recording medium 100 comprises a substrate 101, a conductive layer 102 provided on the substrate 101, an insulating layer 103 provided on the conductive layer 102, and a recording layer 104 provided in the insulating layer 103. The detailed structures of the recording layer 104 and insulating layer 103 will be described below.

The recording layer 104 includes a plurality of conductive portions which are separated by the insulating layer 103 and electrically set in a floating state. In other words, the recording layer 104 has a slit structure.

The insulating layer 103 includes a lower insulating layer 103a, insulating layer 103b, and upper insulating layer 103c. The lower insulating layer 103a is provided between the conductive layer 102 and the recording layer 104. The insulating layer 103b is provided between the plurality of portions of the recording layer 104. The upper insulating layer 103c is provided on the recording layer 104 and insulating layer 103b.

The recording/reproducing head 200 is formed by sequentially laminating a conductive layer 201, insulating layer 202, conductive layer 203, and insulating layer 204 (referred to as a structure (A) hereinafter). The conductive layers 201 and 203 are provided to apply an electric field to the insulating layer 202 and flow a tunnel current that tunnels the insulating layer 202.

The insulating layer 202 is provided to increase the energy of electrons supplied from the conductive layer 201 to generate hot electrons. That is, the energy of hot electrons is determined on the basis of the thickness and bandgap of the insulating layer 202. The insulating layer 204 is provided to prevent hot electrons generated in the conductive layer 203 from traveling straight and escaping from the conductive layer 203 to the outside.

The contact surfaces between the plurality of layers (i.e., the conductive layer 201, insulating layer 202, conductive layer 203, and insulating layer 204) included in the recording/reproducing head 200 are arranged to be almost perpendicular to a direction (i.e., the in-plane direction perpendicular to the thickness direction) along the principal surface (upper surface) of the recording medium 100.

A bias circuit 301 that applies a negative voltage between the conductive layers 201 and 203 is connected to the conductive layers 201 and 203. A bias circuit 302 that applies a negative voltage between the recording/reproducing head 200 (more specifically, the conductive layer 201) and the conductive layer 102 is connected to the recording/reproducing head 200 and conductive layer 102.

The recording operation of the recording/reproducing apparatus with the above-described arrangement will be described. First, a negative voltage is applied between the conductive layers 201 and 203. By a tunnel effect, a tunnel current flows from the conductive layer 201 to the conductive layer 203 through the insulating layer 202. Simultaneously, a negative voltage is applied between the recording/reproducing head 200 and the recording medium 100 (more specifically, between the conductive layers 201 and 102).

Hot electrons generated as the tunnel current flows through the insulating layer 202 are injected into the recording layer 104 of the recording medium 100 as electrons. As a result, charges are stored in the recording layer 104. In this way, data can be recorded on the recording medium 100.

When the contact surfaces between the plurality of layers of the recording/reproducing head 200 are almost perpendicular to the principal surface of the recording medium 100, electrons pop out from near the contact surface between the insulating layer 202 and the conductive layer 203 toward the recording medium 100. That is, since the electrons pop out from the very small region, the recording density can be increased. In addition, the recording/reproducing head 200 can be microfabricated.

Figure 2:
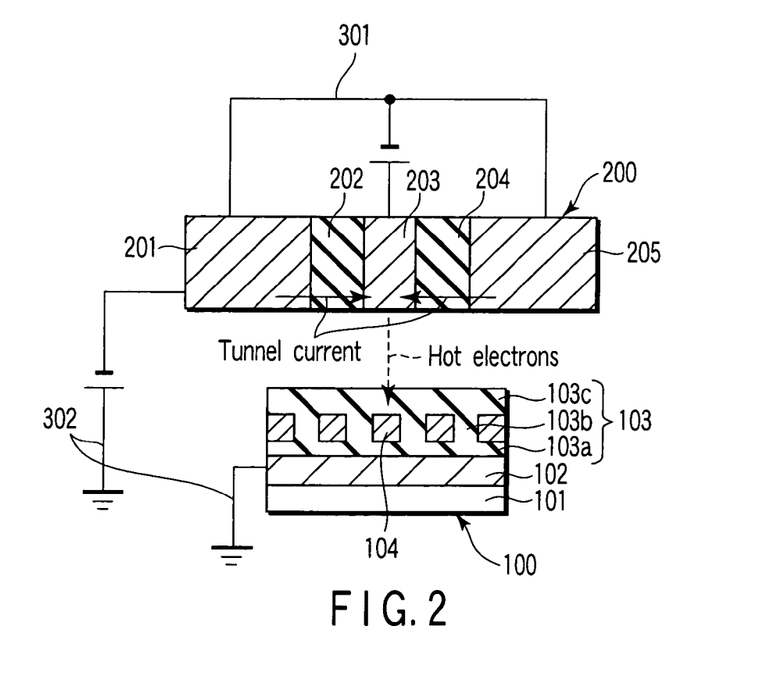
FIG. 2 is a sectional view illustrating another example of the principle of the recording/reproducing apparatus.

FIG. 2 is a sectional view illustrating another example of the principle of the recording/reproducing apparatus. The recording/reproducing head 200 is formed by sequentially stacking the conductive layer 201, insulating layer 202, conductive layer 203, insulating layer 204, and conductive layer 205 (referred to as a structure (B) hereinafter). The contact surfaces between the plurality of layers (i.e., the conductive layer 201, insulating layer 202, conductive layer 203, insulating layer 204, and conductive layer 205) included in the recording/reproducing head 200 are arranged to be perpendicular to the direction along the principal surface of the recording medium 100.

The bias circuit 301 applies a negative voltage between the conductive layers 201 and 203. The bias circuit 301 also applies a negative voltage between the conductive layers 205 and 203. The bias circuit 302 applies a negative voltage between the recording/reproducing head 200 (more specifically, the conductive layer 201) and the conductive layer 102.

In the recording/reproducing apparatus with the above-described arrangement, a first tunnel current can be flowed from the conductive layer 201 to the conductive layer 203 through the insulating layer 202. In addition, a second tunnel current can be flowed from the conductive layer 205 to the conductive layer 203 through the insulating layer 204. Hence, a larger amount of hot electrons can be generated as compared to the structure (A). Consequently, electrons can be injected into the recording layer 104 at high speed, and therefore, high-speed data recording can be implemented.

As will be described later, the principle of the embodiment for injecting hot electrons into the recording medium 100 can be used even in reproducing data recorded on the recording medium 100. Detailed embodiments of the recording/reproducing apparatus of the present invention will be described below.

First Embodiment

Figure 3:
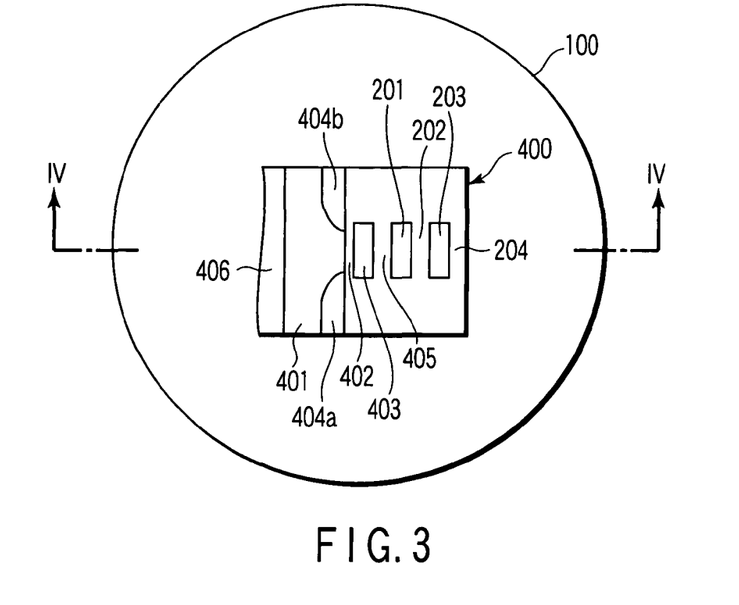
FIG. 3 is a plan view illustrating a recording/reproducing apparatus according to the first embodiment.
Figure 4:
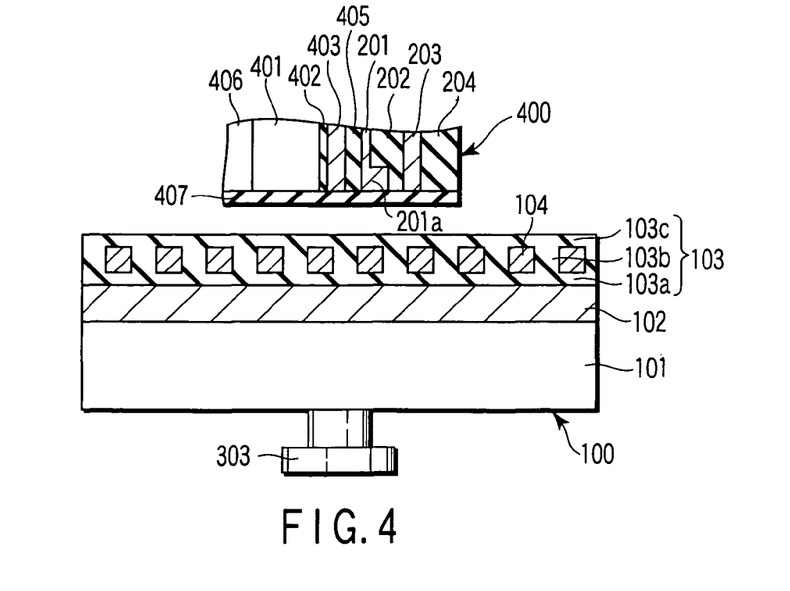
FIG. 4 is a sectional view illustrating the recording/reproducing apparatus taken along a line IV-IV in FIG. 3.

FIG. 3 is a plan view illustrating a recording/reproducing apparatus according to the first embodiment of the present invention. FIG. 4 is a sectional view illustrating the recording/reproducing apparatus taken along a line IV-IV in FIG. 3.

The structure of a recording medium 100 will be described. A conductive layer 102 is provided on a substrate 101. As the substrate 101, a disk formed of, e.g., glass and having a diameter of about 60 mm and a thickness of about 1 mm is used. As the conductive layer 102, for example, aluminum (Al) having a thickness of about 500 nm is used.

A lower insulating layer 103a is provided on the conductive layer 102. As the lower insulating layer 103a, for example, $Ta_2O_5$ having a thickness of about 20 nm is used. A recording layer 104 including a plurality of portions is provided on the lower insulating layer 103a. As the recording layer 104, for example, aluminum (Al) is used. The width (i.e., the length of each of the vertical and horizontal sides of the upper surface) and thickness of each portion of the recording layer 104 are about 10 nm. The interval of the plurality of portions of the recording layer 104 is about 10 nm.

An insulating layer 103b is provided between the plurality of portions of the recording layer 104. As the insulating layer 103b, for example, a silicon oxide film is used. An upper insulating layer 103c is provided on the recording layer 104 and insulating layer 103b. As the upper insulating layer 103c, for example, diamond like carbon (DLC) having a thickness of about 3 nm is used. The portions of the recording layer 104 are electrically disconnected by an insulating layer 103 including the lower insulating layer 103a, insulating layer 103b, and upper insulating layer 103c.

An example of the manufacturing method of the recording medium 100 with the above-described structure will be described. An Al layer serving as the conductive layer 102 is evaporated to a thickness of about 500 nm on a disk serving as the substrate 101. A $Ta_2O_5$ layer serving as the lower insulating layer 103a is deposited to a thickness of about 20 nm on the conductive layer 102.

A plurality of Al layers having a thickness and width of about 10 nm are buried in an $SiO_2$ layer on the lower insulating layer 103a by using nano-imprint. With this process, the recording layer 104 and insulating layer 103b are formed on the lower insulating layer 103a. A DLC layer serving as the upper insulating layer 103c is evaporated to a thickness of about 3 nm on the recording layer 104 and insulating layer 103b. The recording medium 100 is thus formed.

The structure of a recording/reproducing head 400 will be described next. The recording/reproducing head 400 is formed by adding, to the recording/reproducing head 200 described above, a reproducing head that reproduces data recorded on the recording medium 100. The reproducing head includes, e.g., a field effect transistor (FET) sensor.

More specifically, a gate insulating film 402 is provided on a semiconductor substrate 401. As the semiconductor substrate 401, for example, a p-type silicon substrate is used. As the gate insulating film 402, for example, a silicon oxide film is used. A gate electrode 403 is provided on the gate insulating film 402. As the gate electrode 403, for example, polysilicon having a thickness of about 1 μm is used.

A source region 404a and drain region 404b which are formed of $n^+$-type diffusion layers are provided in the semiconductor substrate 401 on both sides of the gate electrode 403. The reproducing head is thus formed. The reproducing head is not limited to the FET sensor. Any other device capable of detecting the charge amount in the recording layer 104 can be used. Electrodes (not shown) are formed on the source region 404a and drain region 404b. These electrodes are connected to a bias circuit (not shown) to reproduce data.

A recording head is provided on the reproducing head through an insulating layer 405. As the insulating layer 405, for example, a silicon oxide film having a thickness of about 20 nm is used. More specifically, a conductive layer 201, insulating layer 202, conductive layer 203, and insulating layer 204 are sequentially stacked on the insulating layer 405. As the conductive layers 201 and 203, for example, Al having a thickness of about 2 to 5 nm is used. As the insulating layers 202 and 204, for example, a silicon oxide film having a thickness of about 2 to 5 nm is used.

The tunneling ratio on the head point side is preferably increased so that a tunnel current intensively flows to the side close to the recording medium 100. For this purpose, the conductive layer 201 has a projecting portion 201a on the lower side. The projecting portion 201a projects toward the conductive layer 203. Alternatively, the conductive layer 203 may have a projecting portion that projects toward the conductive layer 201.

The contact surfaces between the plurality of layers included in the recording/reproducing head 400 are arranged to be perpendicular to a direction along the principal surface (upper surface) of the recording medium 100. A protective film 407 formed of, e.g., DLC is provided on the lower surface (i.e., a surface facing the recording medium 100) of the recording/reproducing head 400. Hence, when the recording/reproducing head 400 and recording medium 100 physically contact each other, the recording/reproducing head 400 can be protected.

An example of the manufacturing method of the recording/reproducing head 400 with the above-described structure will be described. A silicon oxide film is deposited on a p-type silicon substrate serving as the semiconductor substrate 401. The silicon oxide film is patterned into a desired planar shape to form the gate insulating film 402. Phosphorus (P) or the like is introduced into the semiconductor substrate 401 by using the gate insulating film 402 as a mask, thereby forming the source region 404a and drain region 404b each formed of an $n^+$-type diffusion layer.

A polysilicon layer is deposited to a thickness of about 1 μm on the gate insulating film 402. The polysilicon layer is patterned into a desired planar shape to form the gate electrode 403. More specifically, a mask layer having a desired planar shape is formed on the polysilicon layer. The polysilicon layer is wet-etched using the mask layer as a mask, thereby forming the gate electrode 403.

An Al layer is deposited on the source region 404a and drain region 404b. The Al layer is patterned to form two electrodes electrically connected to the source region 404a and drain region 404b, respectively. A reproducing head is thus formed.

An $SiO_2$ layer serving as the insulating layer 405 is deposited to a thickness of about 20 nm on the reproducing head. An Al layer, $SiO_2$ layer, Al layer, and $SiO_2$ layer each having a thickness of about 2 to 5 nm are stacked on the insulating layer 405. An electrode electrically connected to each Al layer is formed.

The plurality of layers stacked are cut vertically with respect to the contact surfaces. The cut surface serves as the point of the recording/reproducing head 400. A DLC layer serving as the protective film 407 is formed on the cut surface. The recording/reproducing head 400 is thus formed.

A flying slider 406 serving as a support member to support and drive the recording/reproducing head 400 is connected to the recording/reproducing head 400. The recording/reproducing apparatus comprises a motor 303 to rotate the recording medium 100. Bias circuits 301 and 302 (not shown) described above are connected to the recording/reproducing head 400 and recording medium 100, respectively.

In this embodiment, the recording/reproducing head 400 having the above-described structure (A) is exemplified. However, the structure (B) may be used. In this case, a conductive layer 205 is formed on the insulating layer 204. As the conductive layer 205, for example, Al having a thickness of about 2 to 5 nm is used.

To generate hot electrons with sufficient energy, the insulating layer 202 preferably has a bandgap of 2 eV or more. A thickness D and bandgap A of the insulating layer 202 preferably satisfy the following relations.

$$D \cdot A > 5 \text{ eV} \cdot \text{nm}$$

$$A > 2 \text{ eV}$$

Examples of materials capable of satisfying the relations are MgO, Al$_2$O$_3$, SiO$_2$, TiO$_2$, AlN, Si$_3$N$_4$, SiC, and TiC. If the recording/reproducing head 400 has the structure (B), each of the insulating layers 202 and 204 needs to satisfy the above relations.

In the recording/reproducing head 400 having the structure (A), to prevent generated hot electrons from traveling straight and escaping from the recording/reproducing head 400 to the outside, the bandgap of the insulating layer 204 must be higher than at least that of the insulating layer 202 and is preferably as high as possible.

In the recording medium 100, the following conditions are preferably taken into consideration. In the recording medium 100, it is necessary to prevent charges stored in the portions of the recording layer 104 from diffusing to the periphery. To do this, sufficient insulating properties must be ensured around the recording layer 104. In addition, charges stored in an arbitrary portion of the recording layer 104 must be prevented from moving to adjacent portions of the recording layer 104 through the upper surface of the recording medium 100 and air. For this purpose, bandgap $\Delta s$ and thickness $ds$ of the upper insulating layer 103$c$ preferably satisfy the following relation.

$$100 \text{ eV} \cdot \text{nm} > \Delta s \cdot ds > 10 \text{ eV} \cdot \text{nm}$$

From the viewpoint of reduction of power consumption and circuit scale, the external operating voltage in recording data on the recording medium 100 must be low. For this purpose, the potential difference between the recording/reproducing head 400 and the recording layer 104 is preferably close to that between the recording/reproducing head 400 and the conductive layer 102. In recording data in an arbitrary portion of the recording layer 104, a write error in adjacent portions must be prevented.

The conductive layer 102, lower insulating layer 103$a$, and recording layer 104 can be regarded as a capacitor CP1. The recording layer 104, upper insulating layer 103$c$, and recording/reproducing head 400 (more specifically, the conductive layer 203) can be regarded as a capacitor CP2. The adjacent conductive portions of the recording layer 104 and the insulating layer 103$b$ between them can be regarded as a capacitor CP3.

Hence, the recording/reproducing head 400 and conductive layer 102 which receive a voltage from the bias circuit 302 are equivalent to a structure wherein the capacitors CP1 and CP2 are connected in series. The adjacent conductive portions of the recording layer 104 and the recording/reproducing head 400 are equivalent to a structure wherein the capacitors CP2 and CP3 are connected in series.

To reduce the external operating voltage in recording data on the recording medium 100, a capacitance C1 between the conductive layer 102 and the recording layer 104, a capacitance C2 between the recording layer 104 and the recording/reproducing head 400 when the recording/reproducing head 400 comes close to the recording layer 104, and a capacitance C3 between the adjacent conductive portions of the recording layer 104 need to satisfy the following relations.

$$0.1 < C2/C1 < 1$$

$$0 < C3/C2 < 0.7$$

As described above, even in microfabricating the recording medium 100, the above relations must be satisfied. The capacitance of a capacitor is proportional to the dielectric constant of a dielectric layer provided between electrodes and the area of opposed electrodes and inversely proportional to the distance between the opposed electrodes. Hence, the size of each layer included in the recording medium 100 is set to satisfy the above relations.

When the recording medium 100 is further microfabricated, the number of carriers in the conductive portions of the recording layer 104 decreases. If the number of carriers reaches about less than 10, the recording variation is too large, and data reproduction becomes difficult. This situation must be avoided by selecting materials and shapes that satisfy the following condition. That is, a carrier concentration n and volume V of the conductive portions of the recording layer 104 need to satisfy $$n \cdot D > 10$$

When this condition is satisfied, the charge storage recording/reproducing apparatus operates more effectively.

The recording operation and reproducing operation of the recording/reproducing apparatus with the above-described arrangement will be described. The recording operation of the recording/reproducing apparatus will be described first.

The disk-shaped recording medium 100 is rotated at about 4,000 rpm by using the motor 303. The flying slider 406 is moved in the radial direction at about 200 μm/min. The bias circuit 301 applies a negative voltage between the conductive layers 201 and 203 to flow a current of about 100 μA from the conductive layer 203 to the conductive layer 201, thereby generating hot electrons in the conductive layer 203.

The bias circuit 302 repeatedly applies a voltage of about −5V between the recording/reproducing head 400 and the recording medium 100 at a pulse width of about 10 nsec and a pulse interval of about 20 nsec. Charges excited in the recording/reproducing head 400 are injected into a desired portion of the recording layer 104. In this way, data recording on the recording medium 100 is implemented.

The reproducing operation of the recording/reproducing apparatus will be described next. Data reproduction is executed by the FET sensor. A voltage of about 20 mV is applied between the source region 404$a$ and the drain region 404$b$ of the FET sensor by using the bias circuit. At this time, an electric field leaks from the recording medium 100 due to charges stored in the recording layer 104 of the recording medium 100. The FET sensor senses the electric field.

More specifically, a measuring circuit (not shown) measures the current between the source region 404$a$ and the drain region 404$b$ of the FET sensor. If the drain current increases, it is determined that charges are stored in an arbitrary portion of the recording layer 104. In this way, data recorded on the recording medium 100 is reproduced.

The error ratio of thus reproduced data was about 0.001% with respect to recorded data. Hence, the data is supposed to be stably recorded on the recording medium 100.

As described above in detail, according to this embodiment, data is recorded using hot electrons. Hence, a recording/reproducing apparatus with a very high recording density can be formed. Data recording can be done at a high speed by increasing the recording density.

Additionally, a recording/reproducing apparatus which can reduce power consumption as compared to an optical assist scheme of recording data by using light and enables microfabrication can be formed.

As described above, the error ratio in reproducing data recorded on the recording medium 100 can be reduced. Hence, a recording/reproducing apparatus capable of reliably recording data can be formed.

Second Embodiment

In the second embodiment, a ferroelectric is used in a recording medium, and data is recorded by using spontaneous polarization of the ferroelectric. Data recorded on the recording medium is reproduced by using hot electrons.

Figure 5:
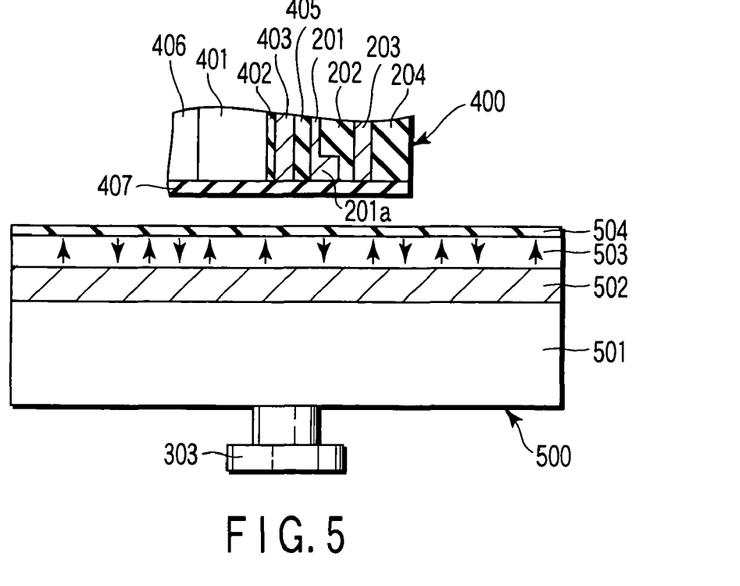
FIG. 5 is a sectional view illustrating a recording/reproducing apparatus according to the second embodiment.

FIG. 5 is a sectional view illustrating a recording/reproducing apparatus according to the second embodiment of the present invention. The structure of a recording/reproducing head 400 is the same as in the first embodiment. That is, in the second embodiment, the structure of a recording medium is different from that of the first embodiment.

The structure of a recording medium 500 will be described. A conductive layer 502 is provided on a substrate 501. As the substrate 501, a disk formed of, e.g., an $SrTiO_3$ single-crystal substrate having a diameter of about 60 mm and a thickness of about 1 mm is used. As the conductive layer 502, for example, platinum (Pt) having a thickness of about 500 nm is used.

A recording layer 503 with ferroelectricity is provided on the conductive layer 502. As the recording layer 503, a ferroelectric such as $PbZr_{0.5}Ti_{0.5}Ti_{0.5}O_3$ having a thickness of about 30 nm is used. The structure of the recording layer 503 is different from that of the recording layer 104 of the first embodiment (i.e., the recording layer 503 has no slit structure). Hence, neither separation in the in-plane direction nor patterning is necessary.

The recording layer 503 having ferroelectricity has spontaneous polarization. The spontaneous polarization is inverted by an electric field which is applied to the recording layer 503. Arrows in the recording layer 503 in FIG. 5 indicate the directions of spontaneous polarization. That is, the recording medium 500 records data by spontaneous polarization in a portion of the recording layer 503.

When the ferroelectric has orientation that causes ferroelectricity in the thickness direction, the direction of dipole is the thickness direction. The dipole is orientated in the thickness direction. With this orientation, the influence of dipole is small in a direction (in-plane direction) perpendicular to the thickness direction. Hence, the recording density can be increased.

A protective film 504 is provided on the recording layer 503. As the protective film 504, for example, polyimide is used.

An example of the manufacturing method of the recording medium 500 with the above-described structure will be described. A Pt layer serving as the conductive layer 502 is evaporated to a thickness of about 500 nm on a disk serving as the substrate 501. A $PbZr_{0.5}Ti_{0.5}O_3$ layer serving as the recording layer 503 is epitaxially grown to a thickness of about 30 nm on the conductive layer 502 by using RF magnetron sputtering. A polyimide film is formed on the recording layer 503 as the protective film 504 of the recording layer 503. The recording medium 500 is thus formed.

The recording operation and reproducing operation of the recording/reproducing apparatus with the above-described arrangement will be described. The recording operation of the recording/reproducing apparatus will be described first.

The disk-shaped recording medium 500 is rotated at about 4,000 rpm by using a motor 303. A flying slider 406 is moved in the radial direction at about 200 μm/min. A bias circuit 302 repeatedly applies a voltage of about −10V between the recording/reproducing head 400 (more specifically, a conductive layer 201) and the recording medium 500 (more specifically, the conductive layer 502) at a pulse width of about 10 nsec and a pulse interval of about 20 nsec.

In this way, an electric field is applied to an arbitrary portion of the recording layer 503 to cause polarization in the portion of the recording layer 503. At this time, no voltage is applied between the conductive layers 201 and 203. That is, no hot electrons are used to record data. In this way, data recording on the recording medium 500 is implemented.

The reproducing operation of the recording/reproducing apparatus will be described next. In this embodiment, hot electrons are used for the reproducing operation. A bias circuit 301 applies a negative voltage between the conductive layers 201 and 203 to flow a current of about 100 μA from the conductive layer 203 to the conductive layer 201, thereby generating hot electrons in the conductive layer 203.

The bias circuit 302 applies a voltage between the recording/reproducing head 400 and the recording medium 500. The voltage is set to, e.g., about −0.1V to satisfy a very low voltage condition not to disturb data recorded on the recording medium 500. With this operation, charges (electrons) are injected into the recording medium 500 to remove ions that are adsorbed on the upper surface of the recording medium 500 and shield the recorded data on it. In this way, the recorded data on the recording medium 500 can be exposed to its upper surface.

In this embodiment, to record data on the recording medium 500, polarization is caused in the recording layer 503. Hence, charges of two signs (+ and −) recorded in the recording layer 503 must be detected. For this purpose, the FET sensor comprises an NPN junction FET for detecting positive charges and a PNP junction FET for detecting negative charges.

A voltage of about 20 mV is applied between the source region and the drain region of each of the two FETs sensor by using the bias circuit. The two FETs sense an electric field that leaks from the recording medium 500. In this way, data recorded on the recording medium 500 is reproduced.

The error ratio of thus reproduced data was about 0.002% with respect to recorded data. Hence, the data is supposed to be stably recorded on the recording medium 500, although the stability is lower than the first embodiment.

As described above in detail, according to this embodiment, the present invention can be practiced even when a ferroelectric is used in the recording layer 503 of the recording medium 500. The effects of power consumption reduction and microfabrication are the same as in the first embodiment.

As described above, the error ratio in reproducing data recorded on the recording medium 500 can be reduced. Hence, a recording/reproducing apparatus capable of reliably recording data can be formed.

Since the recording layer 503 of the recording medium 500 need not be separated into a plurality of portions, the manufacturing process of the recording medium 500 can be simplified, and the manufacturing cost can be reduced.

In reproducing recorded data, ions adsorbed on the upper surface of the recording medium 500 are removed by using hot electrons. The ions shield the data recorded in the recording layer 503. However, when the reproducing method of this embodiment is used, the data recorded in the recording layer 503 can accurately be read out. In addition, small charges stored in the recording layer 503 can be detected.

The reproducing method using hot electrons described in this embodiment can also be applied to the first embodiment. That is, this method can be applied to any charge storage recording medium.

Third Embodiment

In the third embodiment, a phase-change material is used in a recording medium, and data is recorded by using the difference in the resistance value of the phase-change material. Additionally, hot electrons are used in both recording data on the recording medium and reproducing data recorded on the recording medium.

Figure 6:
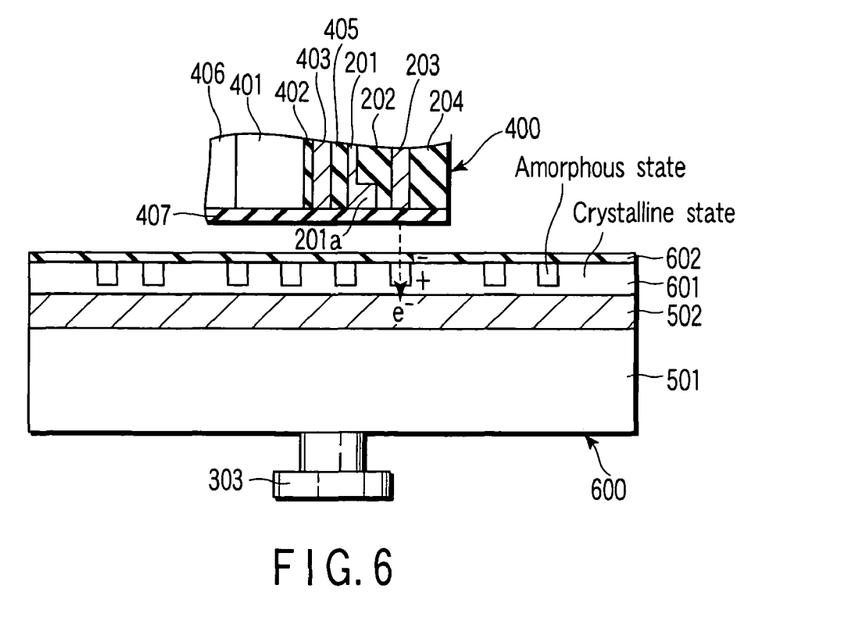
FIG. 6 is a sectional view illustrating a recording/reproducing apparatus according to the third embodiment.

FIG. 6 is a sectional view illustrating a recording/reproducing apparatus according to the third embodiment of the present invention. The structure of a recording/reproducing head 400 is the same as in the first embodiment.

The structure of a recording medium 600 will be described. A recording layer 601 is provided on a conductive layer 502. As the recording layer 601, a phase-change material such as $Ge_2Sb_2Te_5$ having a thickness of about 30 nm is used. The recording layer 601 is formed by epitaxially growing a $Ge_2Sb_2Te_5$ layer to a thickness of about 30 nm by using RF magnetron sputtering. The structure of the recording layer 601 is different from that of the recording layer 104 of the first embodiment. Hence, neither separation in the in-plane direction nor patterning is necessary.

In the recording layer 601 formed of a phase-change material, a heated portion changes from a crystalline state to an amorphous state and vice versa. That is, the recording medium 600 records data by a phase-change in a portion of the recording layer 601. The resistance value of the recording layer 601 changes between the crystalline state and the amorphous state. More specifically, the resistance value is large in the amorphous state and small in the crystalline state. The recording/reproducing head 400 reproduces recorded data by detecting the change in the resistance value.

A protective film 602 is provided on the recording layer 601. As the protective film 602, a lubricating layer having a thickness of about 1 to 2 nm is used. The recording medium 600 is thus formed.

The recording operation and reproducing operation of the recording/reproducing apparatus with the above-described arrangement will be described. In this embodiment, hot electrons are used in both the recording operation and reproducing operation. The recording operation of the recording/reproducing apparatus will be described first.

The disk-shaped recording medium 600 is rotated at about 4,000 rpm by using a motor 303. A flying slider 406 is moved in the radial direction at about 200 μm/min. A bias circuit 301 applies a negative voltage between conductive layers 201 and 203 to flow a current of about 100 μA from the conductive layer 203 to the conductive layer 201, thereby generating hot electrons in the conductive layer 203.

A bias circuit 302 repeatedly applies a voltage of about −5V between the recording/reproducing head 400 and the recording medium 600 at a pulse width of about 10 nsec and a pulse interval of about 20 nsec. Charges excited in the recording/reproducing head 400 pass through the phase-change material of the recording layer 601 and reach the conductive layer 502. Only a portion of the recording layer 601 where the current has passed through is heated and transited to the amorphous state. In this way, data recording on the recording medium 600 is implemented.

The reproducing operation of the recording/reproducing apparatus will be described next. The bias circuit 301 applies a negative voltage between the conductive layers 201 and 203 to flow a current of about 100 μA from the conductive layer 203 to the conductive layer 201, thereby generating hot electrons in the conductive layer 203.

The bias circuit 302 flows a constant current between the recording/reproducing head 400 and the recording medium 600. The constant current is set to, e.g., about −0.1 μA to satisfy a very small current condition not to disturb data recorded on the recording medium 600. With this operation, electrons ($e^-$) are injected into the recording medium 600 (more specifically, a phase-changed portion of the recording layer 601). The amount of charges induced on the surface changes depending on the magnitude of the resistance value of the recording layer 601. That is, the amorphous portion of the recording layer 601 has a large resistance value, and the amount of negative charges induced on the surface is larger than the crystalline portion. The FET sensor senses the charge amount difference.

More specifically, a voltage of about 20 mV is applied between a source region 404a and a drain region 404b of the FET sensor by using the bias circuit. A measuring circuit measures the current between the source region 404a and the drain region 404b of the FET sensor. If the drain current increases, it is determined that charges are stored in an arbitrary portion of the recording layer 601. In this way, data recorded on the recording medium 600 is reproduced.

The error ratio of thus reproduced data was about 0.001% with respect to recorded data. Hence, the data is supposed to be stably recorded on the recording medium 600.

As described above in detail, according to this embodiment, the present invention can be practiced even when a phase-change material is used in the recording layer 601 of the recording medium 600.

In addition, hot electrons are used in recording and reproducing data. Hence, the recording/reproducing apparatus can be microfabricated, and the recording density can be increased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording/reproducing head comprising:
a laminated body arranged to face a recording medium, the body including a first conductive layer, a first insulating layer and a second conductive layer which are sequentially stacked,
wherein the first conductive layer supplies electrons for injection into the recording medium through the first insulating layer, and
wherein the laminated body is arranged so that contact surfaces between the stacked layers are substantially perpendicular to an upper surface of the recording medium.

2. The head according to claim 1, further comprising:
a first bias circuit which applies a first voltage between the first conductive layer and the second conductive layer to generate a flow of the electrons in the laminated body; and
a second bias circuit which applies a second voltage between the recording medium and the laminated body to attract the electrons to the recording medium.

3. The head according to claim 1, wherein the first insulating layer is selected from a group consisting of MgO, $Al_2O_3$, $SiO_2$, $TiO_2$, AlN, $Si_3N_4$, SiC, and TiC.

4. A recording/reproducing head comprising:
a laminated body arranged to face a recording medium, the body including a first conductive layer, a first insulating layer and a second conductive layer which are sequentially stacked, wherein the first conductive layer supplies electrons for injection into the recording medium through the first insulating layer, and wherein the laminated body includes a second insulating layer which is stacked on the second conductive layer and prevents the electrons from escaping to an outside.

5. A recording/reproducing head comprising:

a laminated body arranged to face a recording medium, the body including a first conductive layer, a first insulating layer and a second conductive layer which are sequentially stacked, wherein the first conductive layer supplies electrons for injection into the recording medium through the first insulating layer, and wherein the laminated body includes a second insulating layer and a third conductive layer which are sequentially stacked on the second conductive layer; and the third conductive layer supplies electrons for injection into the recording medium through the second insulating layer.

6. The head according to claim 1, wherein the laminated body includes a second insulating layer which is stacked on the second conductive layer and prevents the electrons from escaping to an outside.

7. The head according to claim 1, wherein the laminated body includes a second insulating layer and a third conductive layer which are sequentially stacked on the second conductive layer; and the third conductive layer supplies electrons for injection into the recording medium through the second insulating layer.

8. A recording/reproducing apparatus comprising:

a recording medium to record data; and a recording/reproducing head which is arranged to face the recording medium, includes a first conductive layer, a first insulating layer and a second conductive layer which are sequentially stacked, and records data on the recording medium or reproduces data recorded on the recording medium, wherein the first conductive layer supplies electrons for injection into the recording medium through the first insulating layer, and wherein the laminated body is arranged so that contact surfaces between the stacked layers are substantially perpendicular to an upper surface of the recording medium.

9. The apparatus according to claim 8, further comprising:

a first bias circuit which applies a first voltage between the first conductive layer and the second conductive layer to generate a flow of the electrons in the recording/reproducing head; and a second bias circuit which applies a second voltage between the recording medium and the recording/reproducing head to attract the electrons to the recording medium.

10. The apparatus according to claim 9, wherein the recording medium includes a third conductive layer, a lower insulating layer provided on the third conductive layer, a recording layer provided on the lower insulating layer to record the data, and an upper insulating layer provided on the recording layer.

11. The apparatus according to claim 10, wherein the recording layer is formed of a conductor and stores charges on the basis of the electrons.

12. The apparatus according to claim 10, wherein the recording layer comprises a ferroelectric material.

13. The apparatus according to claim 12, wherein the recording layer polarizes on the basis of the electrons.

14. The apparatus according to claim 10, wherein the recording layer comprises a phase-change material.

15. The apparatus according to claim 14, wherein the recording layer changes to one of a crystalline state and an amorphous state on the basis of the electrons.

16. The apparatus according to claim 8, wherein in reproducing the recorded data, the recording/reproducing head removes ions adsorbed on an upper surface of the recording medium by injecting the electrons into the recording medium.

* * * * *